Patented Jan. 11, 1949

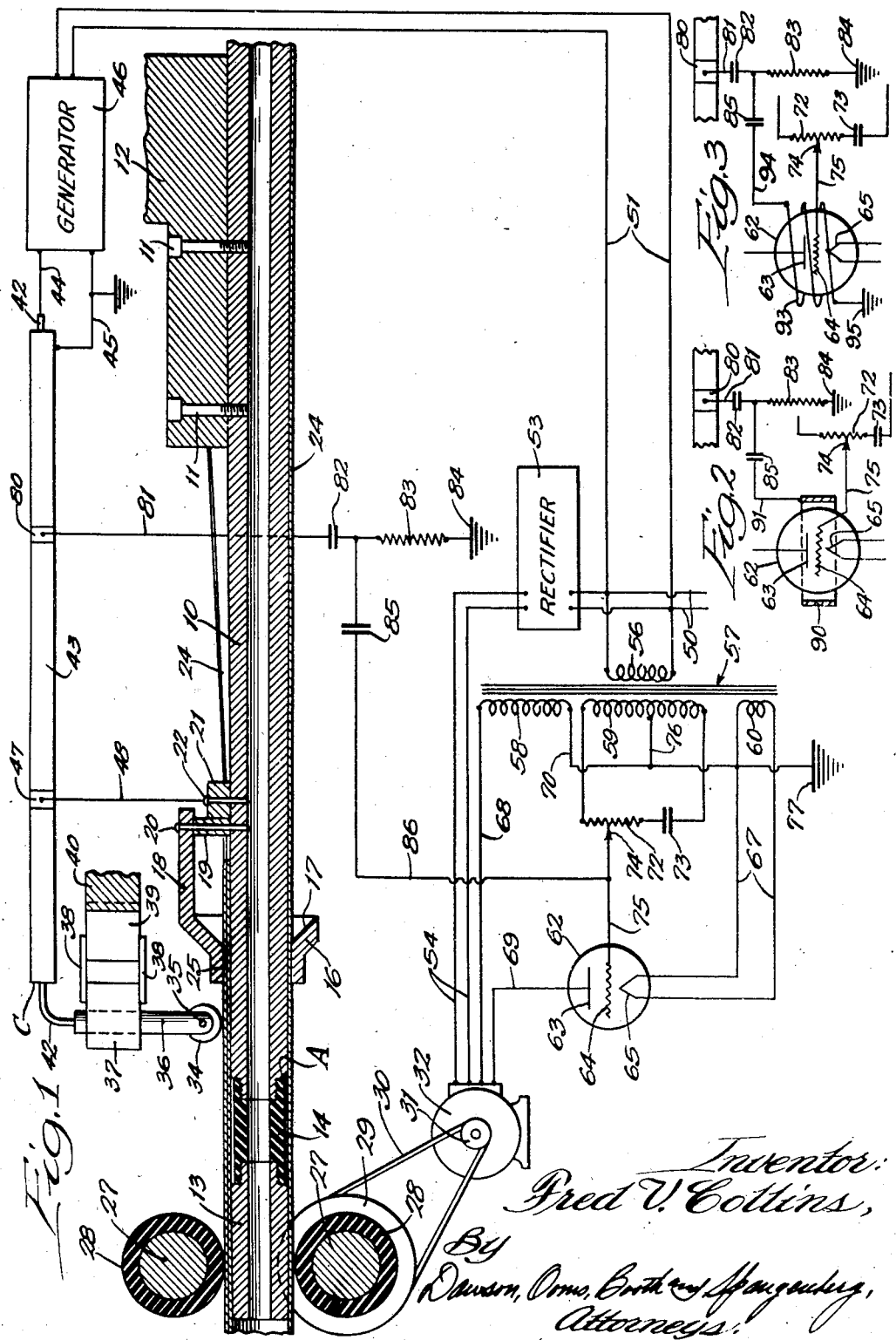

2,458,563

UNITED STATES PATENT OFFICE 2,458,563

TUBE-FORMING DEVICE

Fred V. Collins, Des Plaines, Ill., assignor to William F. Stahl, Kenilworth, Ill.

Application December 31, 1947, Serial No. 794,848

10 Claims. (Cl. 154—42)

This invention relates to apparatus for forming tubes from fusible flat web material.

Such apparatus normally includes means for advancing the web forwardly of a mandrel and into tubular form and such means may include motor driven rolls and a tubular guide or folder. The apparatus also normally includes means for subjecting the edge portions of said tube to the action of high frequency radio waves to fuse said portions and this means may include an electronic foot connected by a co-axial cable to a generator of high frequency radio waves. Such an apparatus is disclosed in my co-pending application Ser. No. 736,760 filed March 24, 1947.

The effectiveness of the fused seal between the edge portions of the tube is dependent upon the speed of advance of the tube, the thickness of the web forming the tube and the strength and frequency of the high frequency radio waves. It is found that the speed of advance of the tube must be carefully correlated with the thickness of the web and the strength and frequency of the high frequency radio waves in order that a commercially successful seal may be obtained at the edge portions of the tube. Fluctuations in the thickness of the web forming the tube and fluctuations in the strength and frequency of the high frequency radio waves caused by supply voltage fluctuations are common occurrences which vary the effectiveness of the seal.

The principal object of this invention, therefore, is to regulate the speed of advance of the tube in accordance with fluctuations in the web thickness and the strength and frequency of the high frequency radio waves in order to provide a commercially successful seal at the edge portions of the tube regardless of these fluctuations.

It is also found that a standing wave appears in the co-axial cable between the high frequency radio wave generator and the electronic foot and that the position of the standing wave shifts upon a change in strength and frequency of the high frequency radio waves and upon a change in terminal capacity at the electronic foot which in turn is caused by a variation in the thickness of the web forming the tube. Thus, a change in position of the standing wave forms an indication of a change in strength and frequency of the high frequency radio waves and a change in thickness of the web.

Accordingly, a further object of this invention is to provide the tube forming apparatus with a speed control device coupled to the co-axial cable for regulating the speed of the tube advancing means to maintain an effective seal at the edge portions of the tube regardless of changes in the strength and frequency of the high frequency radio waves and the thickness of the web forming the tube.

A still further object of this invention is to provide the tube forming apparatus with a gaseous discharge tube for controlling the motor of the tube advancing means and coupling the discharge tube to the co-axial cable for regulating the speed of the motor in accordance with the position of the standing wave and hence in accordance with the strength and frequency of the high frequency radio waves and the thickness of the web forming the tube.

Further objects of this invention reside in the details of construction of the tube forming apparatus and the relation between the component parts thereof.

Other objects and advantages will become apparent to those skilled in the art upon reference to the accompanying specification, claims and drawing in which:

Fig. 1 is a sectional view through the tube forming apparatus with the wiring thereof diagrammatically illustrated;

Fig. 2 is a partial diagrammatical illustration of another form of the invention, and Fig. 3 is a partial diagrammatical illustration of still another form of the invention.

Referring to Fig. 1, the tube forming apparatus includes a mandrel 10 secured by screws 11 to a support 12, the mandrel being formed of metal and preferably provided with a longitudinal bore therein. The mandrel is, also, provided with a metal extension 13 separated from the mandrel by a block of electrical insulating material 14.

A tubular guide or folder 16 having a substantially conical entrance opening 17 surrounds the mandrel 10 and is provided with an extension 18 to be secured by a spacer 19 and screw 20 to the mandrel. A folding member 21 provided with slots is also secured to the mandrel 10 by means of screws 22.

The flat web of fusible material is indicated at 24 and as the web is advanced along the mandrel 10, it is guided and folded into a tube by means of the slots in the folding member 21 and the tubular guide or folder 16. The edge portions of the web are thus overlapped as at 25 to form the tube. The fusible web 24 to be formed into the tube may be of any suitable material, such as cellulose acetate, vinyl acetate, vinyl chloride (co-polymer), etc.

The tube may be advanced along the mandrel by means of rollers 27 provided with resilient tires 28. The rollers are power driven and in this respect either one or both rollers may be driven. As indicated in Fig. 1 the lower roller is provided with a pulley 29 connected by a belt 31 to a pulley of an electric motor 32. Preferably the electric motor, in accordance with this invention, is a D. C. motor provided with a field winding and an armature winding.

The fusing of the overlapped edge portions of the tube is accomplished by an electronic foot located immediately following the tubular guide or folder 16. The electronic foot includes a roller 34 rotating on a shaft 35 carried by a post 36 mounted in a block 37 which is preferably made of insulating material. The post 36 may be adjustably positioned within the block 37 in any suitable manner. The block 37 is in turn carried by a pair of leaf springs 38 carried by a block 39 which in turn may be supported through a tongue and groove connection to a stationary support 40. The block 39 may also be adjustably positioned in the stationary support 40. Preferably, the roller 34 is made to engage the seam of the tube with a small amount of pressure being applied thereto by the springs 38. Thus, if there is a variation in the thickness of the web forming the tube such variations are taken care of by springs 38 so that the roller 34 is maintained in engagement with the seam of the tube at all times regardless of such variations.

High frequency radio waves are supplied to the electronic foot by means of a co-axial cable having an inner conductor 42 and an outer conductor 43, the inner conductor 42 being electrically connected to the post 36 and hence to the roller 34. The inner conductor 42 and the outer conductor 43 of the co-axial cable are connected by conductors 44 and 45 to a high frequency wave generator 46, the conductor 45 being grounded. A band 47 and a conductor 48 connect the outer conductor 43 of the co-axial cable to the folding member 15 secured to the mandrel.

It has been determined that the distances between the left end A of the main mandrel 10 and the folding member 21, between the left end C of the co-axial cable and the band 47 and between the left end C of the co-axial cable and the roller 34 of the electronic foot are critical distances. In order to obtain proper matching of the impedances of the output of the high frequency generator and the terminal load at the electronic foot, and in order to obtain maximum power at the electronic foot, these distances should each be substantially one-quarter wave length or a multiple thereof. This insures that the voltage and current are maintained in the proper phase relationship to afford these results.

Line wire 50 leading from some source of power not shown supplies power preferably in the form of 60 cycle alternating voltage to the tube forming apparatus and conductors 51 supply this power to the high frequency generator 46. Power is also supplied from the line wire 50 to the motor 32 for operating the rollers 27 of the tube advancing means.

Ordinarily a relatively wide range of frequencies may be employed in the tube forming apparatus for sealing the edge portions of the tube depending, of course, upon the thickness of the web material being utilized, its power factor, dielectric strength, etc. Frequencies of 200 megacycles have been found successful with the web materials pointed out above, and therefore, the generator 46 may be utilized for producing high frequency radio waves of substantially 200 megacycles.

The electronic foot together with the mandrel 10, the co-axial cable 43, the high frequency generator 46 and the electrical connections therebetween operate to pass high frequency radio waves through the overlapping edge portions of the tube and the effect is to bring about an internal change in the fusible web so that a fusion occurs between the overlapping or adjacent walls of the tube, thus forming an integral seam. If the above specified critical distances are accurately adhered to, then the resonance of the system becomes extremely sharp and maximum power with minimum loss is produced at the electronic foot. If, however, the above distances are varied a slight amount, then the resonant condition of the system is lessened or flattened resulting in a slight decrease in efficiency and the production of a standing wave in the co-axial cable. Slight changes in the strength of the high frequency radio waves and the frequencies thereof will not cause as great a change in the efficiency of the system as if the resonance thereof were critically sharp. However, such changes in the strength and frequency do have some effect upon the formation of the seal of the tube by the electronic foot as do changes in the terminal capacity at the electronic foot caused by varying thicknesses of the fusible web. It is found that as the web is being advanced at a constant speed and the strength and frequency of the high frequency waves or the terminal capacity vary the character of the seal varies. It is also found that, if the speed of advance of the tube is varied in accordance with the change in strength and frequency of the high frequency waves or the terminal capacity so that the speed of the web is slowed down as the strength and frequency decrease and speeded up as they increase a substantially uniform seal may be obtained. It is also found that a substantially uniform seal may be obtained if the speed of the web is increased as the terminal capacity decreases caused by increased thickness of the web and, vice versa, slowed down when the terminal capacity increases. A change in the system caused by the change in terminal capacity or a change in strength and frequency of the high frequency radio waves result in a phase shift of the standing wave in the co-axial cable. The direction of shift of the standing wave depends upon the direction of change in the system, an increase in strength and frequency and a decrease in terminal capacity causing a wave shift in one direction, and a decrease in strength and frequency and an increase in terminal capacity causing a wave shift in the opposite direction. Thus, the standing wave provides an indication of the condition of the system and may be utilized for regulating the speed of the motor 32 to cause the speed of advance of the tube to correspond to the condition of the system for the purposes of obtaining an uniform seal. In this respect the tube forming apparatus is provided with a speed control device for the motor responding to the position of the standing wave in the co-axial cable.

The field winding of the motor 32 is connected by wires 54 through a rectifier 53 to the source of alternating voltage. The line wires 50 also are connected to a primary 56 of a transformer 57 having secondaries 58, 59 and 60. A gaseous discharge tube is designated at 62 and includes a plate 63, a control grid 64, and a cathode in the form of a filament 65. The filament 65 is connected by conductors 67 to the secondary 60 for heating the same, and also, to ground as 77.

One end of the secondary 58 is connected by conductor 68 to the armature winding of the motor 32 which in turn is connected by conductor 69 to the plate 63 of the gaseous discharge tube 62. The filament cathode 65 is connected by conductors 67 and 70 to the other end of the secondary 58 thus forming the plate circuit. A resistance 72 and condenser 73 are connected in series across the secondary 59 and the resistance 72 is engaged by a shiftable contact 74 for the purpose of providing a phase shift network for the control grid 64 of the gaseous discharge tube 62, the contact 74 being connected to the control grid 64 by a conductor 75. The center of the secondary 59 is connected by conductors 76 and 67 to ground and to the filament cathode 65 thus forming a grid circuit provided with phase shifting characteristics. By adjusting the position of contact 74 with respect to resistance 72 the phase of the grid circuit may be adjusted with respect to the phase of the plate circuit in order to vary the time in the alternating cycle at which the gaseous discharge tube fires. Since the gaseous discharge tube is a rectifier, and since, the firing periods thereof may be adjustably regulated by the contact 74, a current having a D. C. component is supplied to the armature winding of the motor 32, the amount of current depending upon the adjustment of the contact 74. There is thus provided a manually regulated speed controller for the electric motor 32, and hence, for the means for advancing the tube along the mandrel.

A band 80 is secured to the co-axial cable at a point between the high voltage and low voltage point of the standing wave preferably about half way therebetween so that the band 80 responds to the intermediate voltage at this point. The band 80 may be located by calculating the position of the standing wave, by measurement of the standing wave or by trial and error. The band 80 is connected through conductor 81, condenser 82 and resistance 83 to ground as indicated at 84. The junction between the condenser 82 and resistance 83 is connected by a condenser 85 and conductor 86 to the control grid 64. High frequency impulses are thereby conducted from the band 80 to the control grid 64, the voltage value thereof corresponding to the voltage of the standing wave in the co-axial cable at the band 80. Since this high frequency, in the neighborhood of 200 megacycles, is extremely large with respect to the 60 cycle frequency supplied to the control grid 64 by the transformer 57, it is in effect a bias voltage as compared thereto. This bias voltage operates in accordance with the position of the standing wave to bias variably the control grid of the gaseous discharge tube to cause the same to fire earlier or later in the power current cycle thereby increasing or decreasing the current supplied to the armature winding of the motor 32 to regulate automatically the speed thereof. In this way the position of the standing wave in the co-axial cable is detected and is utilized for automatically regulating the speed of the motor to make the speed of the tube advancing means correspond to the condition of the system, determined by the terminal capacity and the strength and frequency of the high frequency radio waves.

The band 80 may be conductively coupled to the outer conductor 43 of the co-axial cable or may be capacitively coupled thereto with substantially equal results.

Instead of automatically regulating the firing of the gaseous discharge tube by the control grid connection as illustrated in Fig. 1, automatic regulation of the firing may be accomplished by regulating an electrostatic field about the gaseous discharge tube as illustrated in Fig. 2 or regulating an inductive field about the gaseous discharge tube as illustrated in Fig. 3. It is found that substantially the same results are obtained by these various forms of automatic control.

In Fig. 2 the electrostatic field about the gaseous discharge tube is produced by a plate 90 connected by a conductor 91 to the condenser 85. In Fig. 3 the inductive field about the gaseous discharge tube 62 is produced by a winding 93 connected through conductor 94 to the condenser 85 and to ground as at 95. In each case a shift in the position of the standing wave in the co-axial cable operates to change the electrostatic field or the inductive field for regulating the firing points of the gaseous discharge tube.

While for purposes of illustration several forms of this invention have been disclosed, other forms thereof may become apparent to those skilled in the art, and therefore, this invention is to be limited only by the scope of the appended claims.

I claim:

1. Apparatus for forming tubes from fusible flat web material, comprising a mandrel, means including a variable speed motor for advancing said web forwardly of said mandrel and into tubular form, means including a co-axial cable for subjecting the edge portions of said tube to the action of high frequency radio waves to fuse said portions, and a gaseous discharge tube controlling said motor and coupled to said co-axial cable for regulating the speed of said motor.

2. Apparatus for forming tubes from fusible flat web material, comprising a mandrel, means including a variable speed motor for advancing said web forwardly of said mandrel and into tubular form, means including a co-axial cable for subjecting the edge portions of said tube to the action of high frequency radio waves to fuse said portions, a gaseous discharge tube controlling said motor and having a control grid coupled to said co-axial cable for regulating the speed of said motor.

3. Apparatus for forming tubes from fusible flat web material, comprising a mandrel, means including a variable speed motor for advancing said web forwardly of said mandrel and into tubular form, means including a co-axial cable for subjecting the edge portions of said tube to the action of high frequency radio waves to fuse said portions, a gaseous discharge tube controlling said motor, and an electrostatic field for said tube coupled to said co-axial cable for regulating the speed of said motor.

4. Apparatus for forming tubes from fusible flat web material, comprising a mandrel, means including a variable speed motor for advancing said web forwardly of said mandrel and into tubular form, means including a co-axial cable for subjecting the edge portions of said tube to the action of high frequency radio waves to fuse said portions, a gaseous discharge tube controlling said motor, and an inductive field for said tube coupled to said co-axial cable for regulating the speed of said motor.

5. Apparatus for forming tubes from fusible flat web material, comprising a mandrel, means including a variable speed motor having a field and armature for advancing said web forwardly of said mandrel and into tubular form, means including a co-axial cable for subjecting the edge portions of said tube to the action of high frequency radio waves to fuse said portions, means for supplying D. C. current to the field of said motor, means including a gaseous discharge tube for supplying current with a D. C. component to the armature of said motor for controlling said motor, and means for coupling said gaseous discharge tube to said co-axial cable for regulating the speed of said motor.

6. Apparatus for forming tubes from fusible flat web material, comprising a mandrel, means including a variable speed motor for advancing said web forwardly of said mandrel and into tubular form, means including a co-axial cable for subjecting the edge portions of said tube to the action of high frequency radio waves to fuse said portions, a speed control device coupled to said co-axial cable for regulating the speed of said motor, and means for manually regulating said speed control device for also regulating the speed of said motor.

7. Apparatus for forming tubes from fusible flat web material, comprising a mandrel, means including a variable speed motor for advancing said web forwardly of said mandrel and into tubular form, means including a co-axial cable for subjecting the edge portions of said tube to the action of high frequency radio waves to fuse said portions, a gaseous discharge tube controlling said motor and coupled to said co-axial cable for regulating the speed of said motor, and means for manually controlling said gaseous discharge tube for also regulating the speed of said motor.

8. Apparatus for forming tubes from fusible flat web material, comprising a mandrel, means including a variable speed motor having a field and armature for advancing said web forwardly of said mandrel and into tubular form, means including a co-axial cable for subjecting the edge portions of said tube to the action of high frequency radio waves to fuse said portions, means for supplying D. C. current to the field of said motor, means including a gaseous discharge tube for supplying current with a D. C. component to the armature of said motor for controlling said motor, means for coupling said gaseous discharge tube to said co-axial cable for regulating the speed of said motor, and means for manually controlling said gaseous discharge tube for also regulating the speed of said motor.

9. Apparatus for forming tubes from fusible flat web material, comprising a mandrel, means including a variable speed motor for advancing said web forwardly of said mandrel and into tubular form, means including a transmission line for subjecting the edge portions of said tube to the action of high-frequency radio waves to fuse said portions, and a gaseous discharge tube controlling said motor and coupled to said transmission line for regulating the speed of said motor.

10. Apparatus for forming tubes from fusible flat web material, comprising a mandrel, means including a variable speed motor for advancing said web forwardly of said mandrel and into tubular form, means including a transmission line for subjecting the edge portions of said tube to the action of high-frequency radio waves to fuse said portions, and a gaseous discharge tube controlling said motor and having a control grid coupled to said transmission line for regulating the speed of said motor.

FRED V. COLLINS.

REFERENCES CITED

The following references are of record in the file of this patent:

UNITED STATES PATENTS

| Number | Name | Date |
|---|---|---|
| 2,125,758 | Waters | Aug. 2, 1938 |
| 2,256,506 | Wagner | Sept. 23, 1941 |
| 2,391,086 | Crandell | Dec. 18, 1945 |
| 2,432,412 | Hacklander | Dec. 9, 1947 |
| 2,449,451 | Cassen | Sept. 14, 1948 |